United States Patent [19]

Medwed

[11] Patent Number: 4,603,541
[45] Date of Patent: Aug. 5, 1986

[54] PACKAGING MACHINE

[75] Inventor: Emmerich Medwed, Wolfertschwenden, Fed. Rep. of Germany

[73] Assignee: Multivac Sepp Haggenmuller KG, Fed. Rep. of Germany

[21] Appl. No.: 783,228

[22] PCT Filed: Feb. 7, 1985

[86] PCT No.: PCT/EP85/00045
§ 371 Date: Sep. 26, 1985
§ 102(e) Date: Sep. 26, 1985

[87] PCT Pub. No.: WO85/03488
PCT Pub. Date: Aug. 15, 1985

[30] Foreign Application Priority Data

Feb. 9, 1984 [DE] Fed. Rep. of Germany ....... 3404619

[51] Int. Cl.⁴ ............... B65B 47/04; B29C 51/08; B29C 51/30

[52] U.S. Cl. ........................ 53/561; 53/559; 493/338

[58] Field of Search ............ 53/561, 559, 454, 453; 493/338, 339, 167, 85

[56] References Cited

U.S. PATENT DOCUMENTS

2,911,942 11/1959 Gross .............................. 493/167 X
2,988,208 6/1961 Loew ................................. 206/56
4,261,254 4/1981 Nowacki ......................... 493/167 X
4,342,183 8/1982 Gordon et al. ................... 53/453 X
4,543,770 10/1985 Walter et al. ..................... 53/561 X

Primary Examiner—James F. Coan
Attorney, Agent, or Firm—Donald Brown

[57] ABSTRACT

A packaging machine having a molding station for molding a container from a web of material using a molding die provided with a side wall, a bottom area and an edge area. A rotating cylinder or roll is arranged in at least part of the edge area to prevent damage to the web of material.

6 Claims, 10 Drawing Figures

PACKAGING MACHINE

The invention refers to a packaging machine comprising a molding station for molding a container from a material web by means of a molding die provided with at least one side wall, a bottom area and an edge area therebetween, rotatably supported roll or roller bodies in the edge area and a support securing the roll or roller body against falling out and comprising a mounting, the roll or roller body being disposed in a retracted position such that a part of the surface thereof forms a part of the edge area.

A packaging machine of this kind is disclosed in the U.S. Pat. No. 2,988,208. The molding die of this packaging machine comprises rotatably supported balls within the lower corners thereof and rotatably supported rolls along the lower edges.

It is the object of the invention to improve the packaging machine such that the roll or roller bodies may be supported in a better manner. According to an embodiment of the invention, additionally a specific heating or cooling of the roll or roller bodies is possible.

This object is achieved by a packaging machine of the above-mentioned kind which is characterized in that the support comprises a friction bearing with a bearing seat being adapted to the shape of the roll or roller body and that a channel having one end opening into the bearing seat and another end connectable with a conduit for supplying gaseous medium is provided within the support. With this solution the bearing is improved. The supply of a suitable gaseous medium on the one hand improves the bearing characteristics and on the other hand allows the specific heating or cooling, resp., of the roll or roller bodies acted upon.

According to a further solution the packaging machine is characterized in that a recess for receiving the roll or roller body and a magnet for retaining the roll or roller body within the recess is provided in the edge area. Thus a particularly simple retaining apparatus for the roll or roller body is provided.

Further features of the invention are characterized in the subclaims.

Further features and advantages of the invention will further stand out from the description of embodiments of the invention in connection with the figures. In the figures

Figure 1:
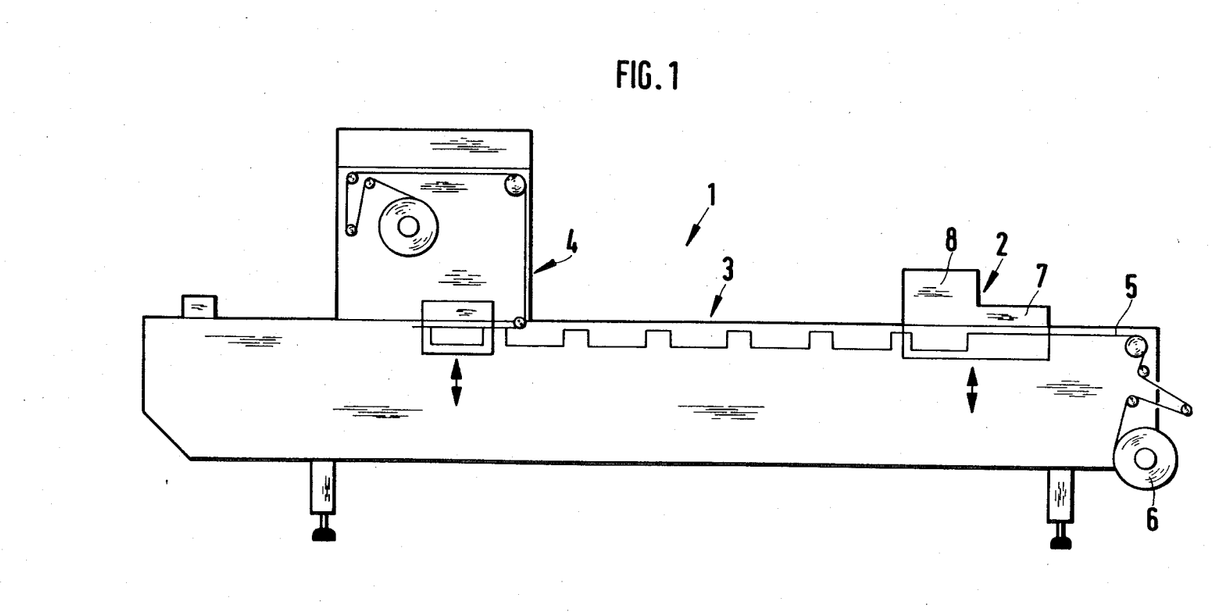
FIG. 1 shows a schematic lateral view of a packaging machine embodying the invention.

FIG. 1 is a schematic representation of a lateral view of an inventive vacuum packaging machine comprising a molding station 2, a filling station 3 and an evacuation and sealing station 4. A material web 5 is drawn from a supply roll 6 and moved through the molding station 2, the filling station 3 and the evacuation and sealing station 4 in subsequent manner.

Figure 2:
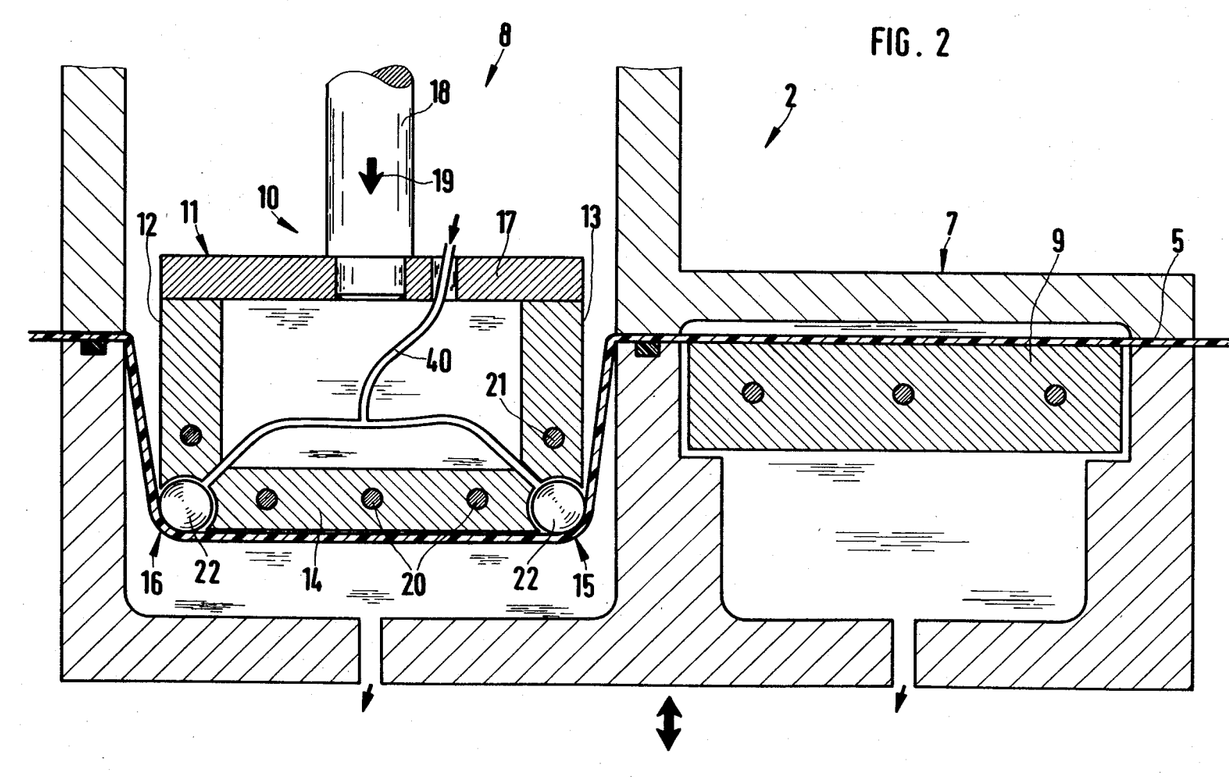
FIG. 2 is a schematic representation of a section through the molding station of the inventive packaging machine.

As schematically represented in FIG. 1 and in particular detectable from FIG. 2, the molding station 2 comprises a heating region 7 and a molding region 8 following in travelling direction of the material web 5. A heating plate 9 which can be brought into contact with the material web 5 for heating the same is provided in the heating region 7. In the molding region 8 a molding die is provided which comprises, as may be in particular seen from FIG. 3, a substantially box-shaped die head 11 with side walls 12, 13, a bottom area 14, an edge area 15, 16 between the side walls 12, 13 and the bottom area 14 and a top wall 17 as well as a die rod 18 connected with the top wall 17. The die rod 18 is connected with a drive (not shown) for moving the molding die 10 in direction of the arrow 19 perpendicularly with respect to the plane of the material web 5. Heating elements 20, 21 for heating the die head 11 are provided in the side walls 12, 13 and in the bottom area 14.

Figure 3:
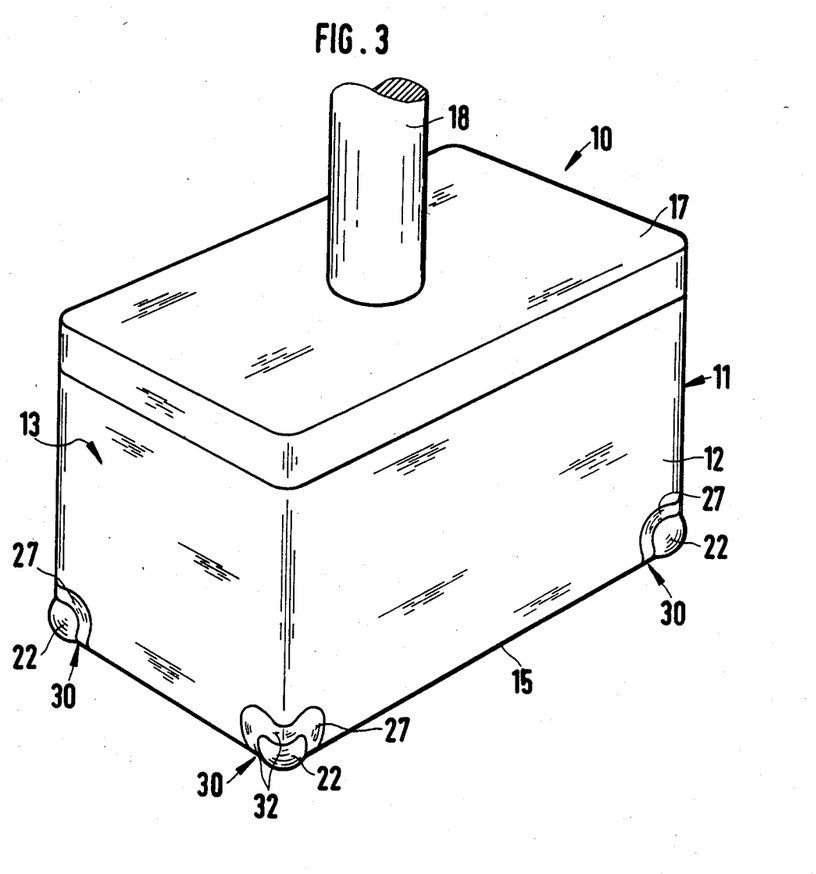
FIG. 3 is a perspective view of an inventive molding die.

As may be in particular seen from the FIGS. 2 and 3, roll or roller bodies or members, resp., formed as balls 22 are disposed in a part of the edge area 15, 16 of the molding die 10, namely in the lower corners, in a retracted manner such that they slightly project outwardly beyond the contour of the die head 11 formed by the side walls 12, 13, the bottom area 14 and the edge areas 15, 16. The balls 12 may also end flush with this contour, of course. This is achieved by selecting the radius of the balls 22 to be substantially equal to the radius of curvature of the edge areas 15, 16 and by locating the balls 22 such that the centre 23 substantially coincides with the centre of curvature of the edge areas 15, 16 or lies slightly outwards thereof. Thus the surface of the balls 22 forms a part of the surface of the molding die in the lower corners thereof.

In this position the balls 22 are supported to be freely rotatable. This is achieved by the support 24 represented in FIG. 4. This support comprises a cylindrical sleeve 25 which is inserted into a bore 26 within the molding die 10. The bore 26 is disposed such that the axis thereof intersects the associated corner of the molding die and includes substantially equal angles with the side walls 12, 13 and the bottom area 14 adjacent to the corner.

Figure 4:
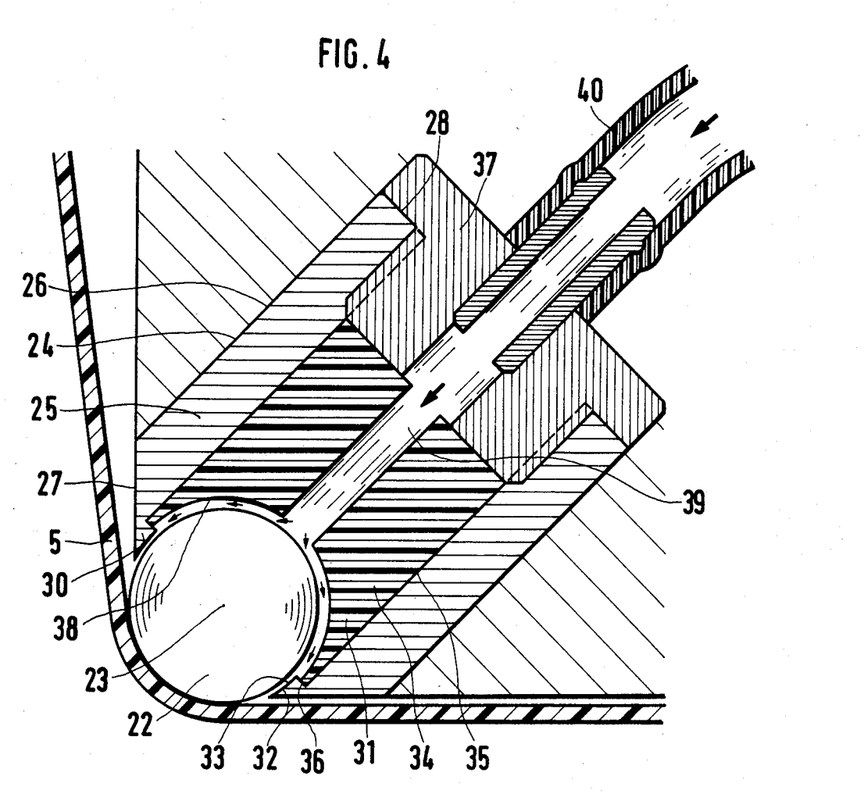
FIG. 4 is a section through one corner of the inventive molding die in a plane in direction of movement of the molding die.

The sleeve 25 comprises an inner bore 29 receiving the ball 22 and extending longitudinally through the sleeve from a first end surface 27 to a second end surface 28, a retainer mounting 30 for retaining the ball 22 against falling out and a bearing member 31 for rotatably bearing the ball 22. The mounting 30 is formed by providing the inner bore 29 with a diameter being slightly smaller than the diameter of the ball 22 in a first section 33 adjacent to the first end surface 27 and by forming the first end surface 27 to substantially end flush with the side walls 12, 13 and the bottom area 14, when the sleeve 25 has been inserted into the bore 26.

Thus at the first end surface 27 three retaining parts are formed as protruding projections 32 being angularly offset from each other by 120° and partly reaching around the ball 22 at three locations and thus prevent the falling out thereof.

The bearing member 31 consists of a cylindrical body 34 which is manufactured of a material which has a low friction coefficient with the ball 22 preferably made of steel, as e.g. teflon or nylon. The body 34 is inserted into a second section 35 of the inner bore 29 adjacent to the first section 33 and having a diameter which is larger than that of the first section 33. Thus an abutment 36 is formed between the first section 33 and the second section 35 and the one end plane of the body is urged in abutment thereto by means of a bolt 37 screwed into the sleeve 25 at the second end surface thereof. At the end plane of the body 34 facing the abutment 36 the body 34 comprises a bearing seat 38 in the form of a hemispherical hollow or groove having a radius which substantially corresponds to the radius of the ball 22. Thus the bearing seat 38 forms a friction bearing surface for the ball 22 to slide freely rotatable thereon in every direction.

Furthermore, a channel 39 is provided extending through the body 34 and the bolt 37 and connecting the groove or bearing seat 38, resp., with a conduit 40 mounted to the bolt 37 and connected with a supply for gaseous medium.

In operation a section of the material web 5 to be molded is at first heated up to a suitable molding temperature in the heating region 7 by means of the heating plate 9 and thereupon conveyed into the molding region 8. At this time the modling die 10 is at first in a lifted position above the material web 5. For molding a container the molding die 10 is subsequently lowered downwards beyond the plane of the material web 5 in direction of the arrow 19. Thereby at first the bottom area 14 engages the material web 5. During the further lowering movement of the molding die 10, with increased molding of the material web 5 to a container, a part of the material which has at first been in engagement with the bottom area 14 travels into the newly formed side walls of the molded container. This material thus slides along the edge areas 15, 16 of the molding die 10 and along the surface of the balls 22 in the corners. Thereby the balls 22 roll on the molded material web and at the same time slide on the bearing seat 38 which leads to a substantial reduction of the frictional forces arising at the corners and acting at the material web and hence, reduces the risk of damaging the material web at the corners which are particularly stressed in the molding process. The friction of the balls 22 in the bearing seats 38 may be further reduced by forcing gaseous medium through the conduit 40 and the channel 39 between the balls 22 and the bearing seats 38. A suitable selection of the temperature of this gaseous medium allows to perform at the same time a determined heating or cooling of the material web in the corners of the molding die 10. After molding by means of the molding die the container may then be urged onto the inner wall of the molding region 8 by action of a differential pressure and hence, may be brought into the final shape.

Figure 5:
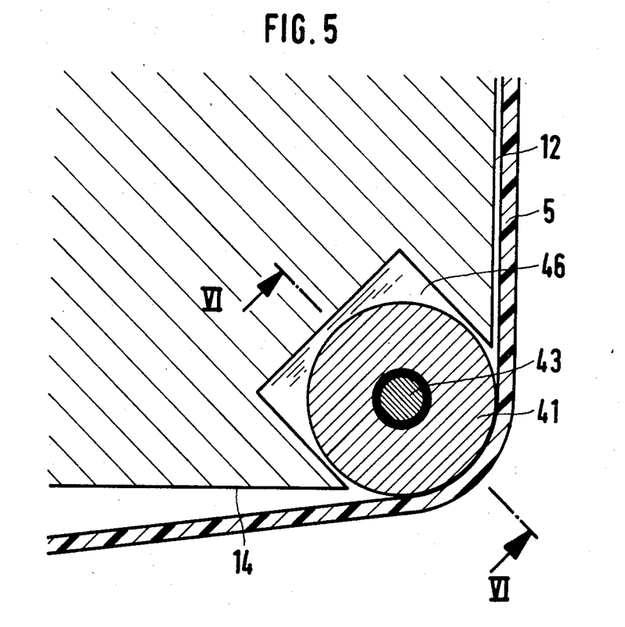
FIG. 5 is a section through one corner of a different embodiment of the molding die in a plane in direction of movement of the molding die.
Figure 6:
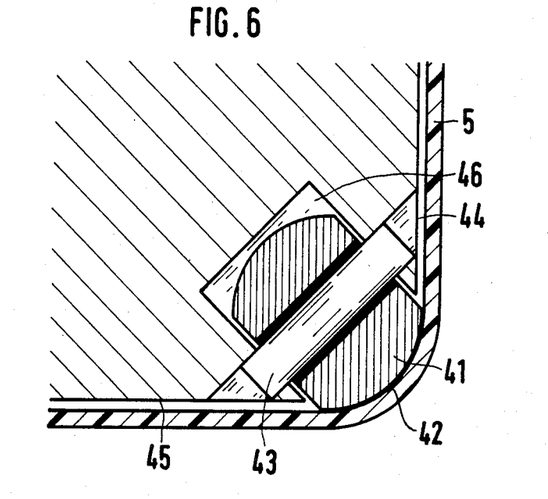
FIG. 6 is a section through one corner of the inventive molding die along the line VI—VI in FIG. 5.
Figure 7:
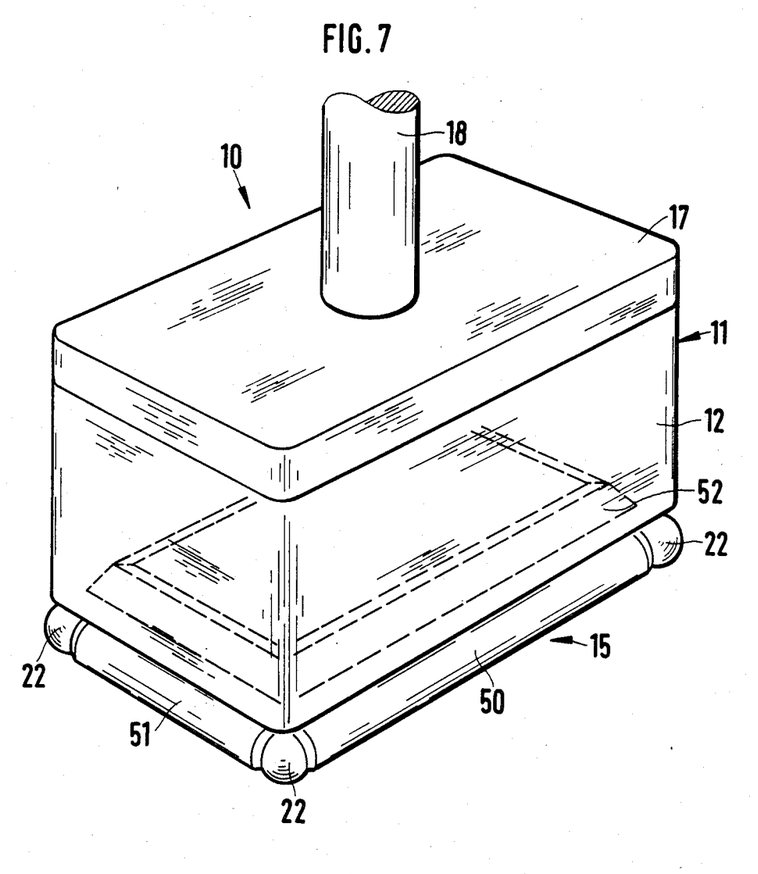
FIG. 7 is a perspective view of a further embodiment of an inventive molding die.
Figure 8:
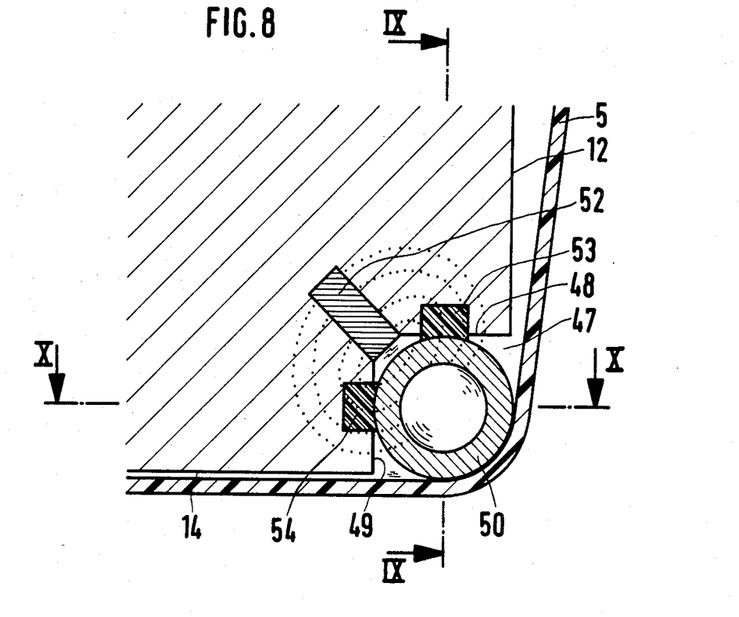
FIG. 8 is a section through an edge of the molding die according to FIG. 7 in direction of movement of the molding die.
Figure 9:
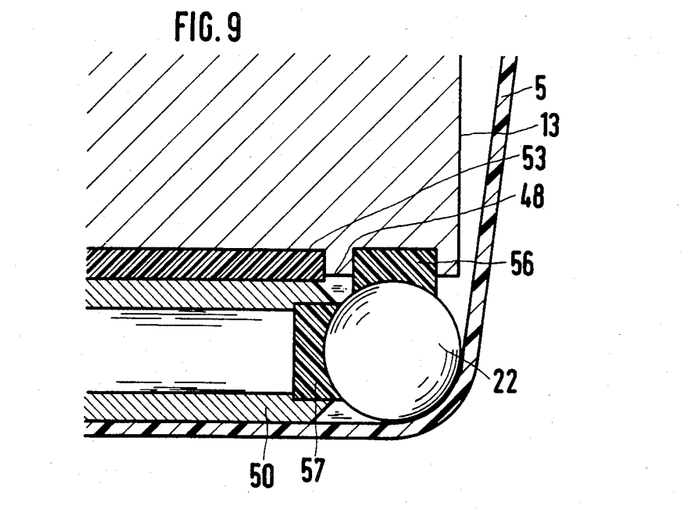
FIG. 9 is a section through a corner region of the molding die according to FIG. 7 along the line IX—IX in FIG. 8.
Figure 10:
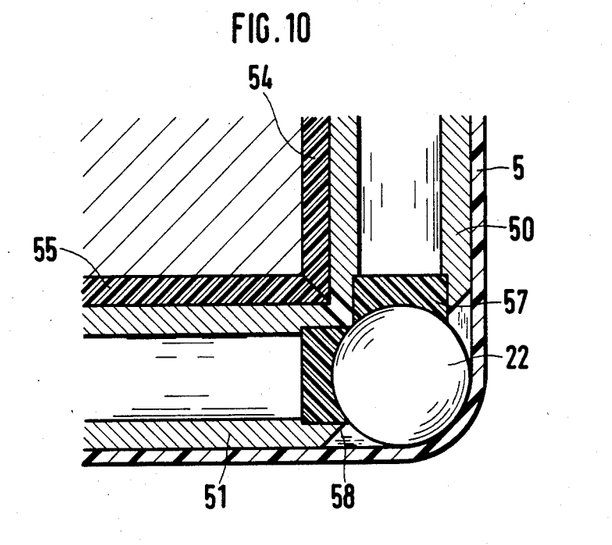
FIG. 10 is a section through a lower corner region of the molding die according to FIG. 7 along the line X—X in FIG. 8.

A further embodiment of the invention is represented in the FIGS. 5 and 6. In this embodiment, a roll 41 having a cambered peripheral surface 42 is disposed in a corner recess 46 of the molding die 10 in place of the ball 22. The roll 41 preferably has the form of a symmetrical section of a sphere. The roll is rotatably supported around an axis 43 lying in a plane which is substantially perpendicular to the direction of movement 19 of the molding die 10 and, in this plane, being substantially perpendicular to the angle bisector of the lines of intersection 44, 45 of the two side walls 12, 13 with this plane. In forming the material web 5, the roll 41 may roll on the material web by turning around the axis 43, which in the same manner reduces the friction of the material web in the corners of the molding die 10.

In the FIGS. 7 to 10 a further embodiment of the invention is represented in which roll or roller bodies are disposed along the entire edge area 15, 16 of the molding die 10. For this purpose a recess 47 is provided within the die 10 which extends over the entire edge region 15, 16 along the lower edges of the die head 11 and which is defined on the side of the molding die by two surfaces 48, 49 which are substantially perpendicular to each other. Roll or roller bodies in the form of rolls 50, 51 disposed along the edges of the molding die 10 and balls 22 disposed in the four corners of the molding die 10 are arranged within the recess 47. The diameter of the rolls 50, 51 or balls 22, resp., is selected such that the surface of the rolls 50, 51 or balls 22, resp., does not or only slightly protrude beyond the side walls 12, 13 or the bottom area 14, resp., in the manner which may in particular be seen from the FIGS. 8 and 9.

The rolls 50, 51 or balls 22, resp., are manufactured from magnetic steel and are retained within the recess 47 by magnets 52. As may be in particular seen from the FIGS. 7 and 8, the magnets 52 are located along the connecting line of the surfaces 48, 49 in the direction of the plane bisecting the angle between surfaces 48, 49 such that one pole of the magnets 52 points at an angle upwards to the side wall 12 and the other points at an angle downwards to the bottom area 14. Hence, the lines of flux of the magnets 52, which are marked in FIG. 8 by dotted lines, pass through the rolls 50, 51 or the balls 22, resp., and hence, retain the same within the recess 47.

Friction bearings 53, 54, 55 for supporting the rolls 50, 51 and for reducing the friction of a rolling motion of the rolls 50, 51 in the recess 47 as well as friction bearings 56 for supporting the balls 22 are provided in the surfaces 48, 49. Additionally friction bearings 57, 58 are provided between the rolls 50, 51 and the balls 22 in order to facilitate a relative motion of the balls 22 with respect to the rolls 50, 51. All friction bearings 53 to 58 are formed shell-shaped corresponding to the respective roll or roller body 50, 51, 22 to be supported in order to allow an unobjectionable guide for the rolling motion of the roll or roller body.

In the embodiments according to the FIGS. 7 to 10 the material web 5 travelling around the edge of the molding die or around the rolls 50, 51, resp., with increased molding of the material web 5, causes a rotational movement of the rolls 50, 51 within the recess 47. The rolls 50, 51 roll on the material web 5 so that the friction at the edges of the molding die 10, which leads to damages of the material web 5 in conventional molding dies, and hence, the risk of a damage of the material web 5 is substantially reduced. Hence, this embodiment further allows to substantially reduce the radius of curvature of the molded container at the edges and corners, e.g. from conventionally 30 mm down to less than 10 mm for flexible foils in an embodiment, which is a particular advantage for packaging articles with sharp corners.

I claim:

1. Packaging machine comprising a molding station for molding a container from a material web by means of a molding die provided with at least one side wall, a bottom area and an edge area therebetween, rotatably supported roll or roller bodies in the edge area and a support securing the roll or roller body against falling out and having a mounting, wherein the roll or roller body is disposed in an emerged or retracted manner such that part of the surface thereof forms part of the edge area, characterized in that the support (24) comprises a friction bearing (31) having a bearing seat (38) adapted to the shape of the roll or roller body (22) and that a channel (39) having one end opening into the bearing seat (38) and the other end connectable with a conduit (40) for supplying gaseous medium is provided within the support (24).

2. Packaging machine according to claim 1, characterized in that the support (24) is designed as a sleeve (25) having three projecting retaining parts (32) which are circumferentially offset by 120° at the one end thereof and a cylindrical friction bearing member (31) inserted thereinto which has a bearing seat (38) in the form of a spherical segment at the end thereof facing the retaining parts (32) and which is retained within the sleeve (25) by means of a mounting element (37) engaging at the other end thereof.

3. Packaging machine comprising a molding station for molding a container from a material web by means of a molding die provided with at least a side wall, a bottom area and an edge area therebetween, rotatably supported roll or roller bodies in the edge area and a support securing the roll or roller body against falling out and comprising a mounting, the roll or roller body being disposed in an emerged or retracted manner such that part of the surface thereof forms part of the edge area, characterized in that a recess (47) for receiving the roll or roller body (22, 50, 51) is provided in the edge region (15, 16) and a magnet (52) for retaining the roll or roller body (22, 50, 51) within the recess (47) is provided.

4. Packaging machine according to claim 3, characterized in that the recess (47) is defined by surfaces (48, 49) disposed at an angle with respect to each other and the magnet (52) is located in the point of intersection or line of intersection, resp., of the surfaces (48, 49).

5. Packaging machine according to claim 4, characterized in that friction bearings (53, 54, 55, 56) are provided at or in the surfaces (58, 59), resp.

6. The packaging machine of any of the claims 1 to 5, characterized in that the edge area comprises balls (22) in the corners thereof and rolls (50, 51) at the edges therebetween and that friction bearings (57, 58) are provided between the balls (22) and the rolls (50, 51).

* * * * *